United States Patent Office 3,746,732
Patented July 17, 1973

3,746,732
SYNTHESIS OF SILYLMETALLIC COMPLEXES
William H. Atwell and Gary N. Bokerman, Midland, Mich., assignors to Dow Corning Corporation, Midland, Mich.
No Drawing. Filed Dec. 15, 1971, Ser. No. 208,414
Int. Cl. C07b *15/00*
U.S. Cl. 260—429 R      8 Claims

ABSTRACT OF THE DISCLOSURE

Silyl complexes of platinum and palladium are prepared by reacting below 150° C. disilanes or hydrosilanes with phosphine complexes of the formula $M(PR'_3)_2Y_2$. Specifically hexachlorodisilane is reacted with $$Pd\{PPhMe_2\}_2Cl_2$$

to give $Pd\{PPhMe_2\}_2(SiCl_3)Cl$ and/or $$Pd\{PPhMe_2\}_2(SiCl_3)_2.$$

---

Silyl complexes of platinum have been described by J. Chatt et al., "Journal of The Chemical Society" A8 p. 1343–1351 (1970). These materials were made by the reaction of trihydrocarbyl silyl lithium with $PtCl_2(PR^2_3)_2$; the reaction of $HSiCl_3$ with $PtHCl(PPhMe_2)_2$ and the reaction of triarylsilanes with $PtCl_2(PMe_2Ph)_2$ the latter in the presence of triethylamine. The reactions involve the formation of lithium chloride, $H_2$ and triethylamine hydrochloride respectively.

Applicants have devised a new method for the preparation of Pt and Pd complexes and have prepared new Pd complexes as shown below. Both the platinum complexes and the new palladium complexes are useful as catalysts for the hydrogenolysis of disilanes to form monosilanes containing the SiH group and as catalysts of the reaction of hydrocarbon halides with disilanes with the formation of a silicon-carbon bond as is described and claimed in applicants' copending application entitled "Transition Metal Catalyzed Silylation," filed concurrently herewith Ser. No. 208,413.

This invention relates to the method of preparing silyl transition metal complexes comprising reacting disilanes of the formula $R_nSi_2Cl_{6-n}$ or hydrosilanes of the formula $HSiR_bCl_{3-b}$ with $M(PR'_3)_2Y_2$ at a temperature not greater than 150° C. whereby compounds of the formula $M(PR'_3)_2(SiR_bCl_{3-b})_mY_{2-m}$ are obtained in which R is a monovalent hydrocarbon radical of from 1 to 18 carbon atoms,
R' is a monovalent hydrocarbon radical of from 1 to 10 carbon atoms,
n is an integer from 0 to 2,
b is an integer from 0 to 1,
M is Pd or Pt,
Y is a halogen other than fluorine and
m is an integer from 1 to 2.

The reactions involved in the method of this invention can be represented schematically as follows:

or

or

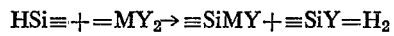

These reactions proceed when there is only one organic group on the silicon or when there is no organic group on the silicon. Thus, the silane reactants can be $HSiCl_3$, $HSiRCl_2$, $Cl_3SiSiCl_3$, $RCl_2SiSiRCl_2$ or $R_2ClSiSiCl_3$.

The reaction is carried out by mixing the silanes and the metal phosphine complexes in any suitable container and heating at a temperature from at or below room temperature to 150° C. Care should be taken to keep moisture away from the SiM complexes since this bond is easily hydrolyzed with water especially under acidic conditions.

If desired, the reaction can be carried out in inert moisture-free solvents such as benzene, toluene, petroleum ether and the like.

This invention also relates to new palladium complexes of the formula $Pd(PR'_3)_2(SiR_cCl_{3-c})_mY_{2-m}$ in which R is a monovalent hydrocarbon of 1 to 18 carbon atoms,
R' is a monovalent hydrocarbon radical of 1 to 10 carbon atoms,
Y is halogen other than fluorine,
c is an integer from 0 to 1, and
m is an integer from 1 to 2.

For the purpose of this invention R can be any monovalent hydrocarbon radical of from 1 to 18 carbon atoms such as alkyl radicals such as ethyl, methyl, isopropyl, butyl, or octadecyl; alkenyl radicals such as vinyl, allyl or octadecenyl; cycloaliphatic radicals such as cyclopentyl, cyclohexyl, methylcyclohexyl, cyclohexenyl, cyclooctenyl, or cyclopentenyl; aralkyl radicals such as benzyl, beta-phenylpropyl or beta-phenylethyl; aryl hydrocarbon radicals such as phenyl, xenyl, naphthyl, anthracyl, tolyl or xylyl.

For the purpose of this invention R' can be any monovalent hydrocarbon radical of from 1 to 10 carbon atoms such as alkyl radicals such as methyl, ethyl, isopropyl, or decyl; alkenyl radicals such as vinyl, allyl, or decenyl; cycloaliphatic radicals such as cyclopentyl, cyclohexyl, cyclohexenyl, methylcyclohexyl or methylcyclooctyl; aralkyl radicals such as benzyl, beta-phenylethyl or beta-phenylpropyl; and aryl radicals such as phenyl, xenyl, naphthyl, tolyl or xylyl.

The following examples are illustrative only and should not be construed as limiting the invention which is properly delineated in the appended claims. The following abbreviations are used infra: Me for methyl, Ph for phenyl and Bu for butyl.

EXAMPLE 1

This example illustrates the reaction of disilanes with the metal phosphine complexes. In each case shown below the metal phosphine complex was dissolved in dry methylene chloride under nitrogen in the amounts specified and the disilane was slowly added thereto. The reaction was allowed to proceed with stirring for the times and temperatures specified. The solvent and byproducts were then removed under vacuum and the remaining product washed with hexane and dried and the structure was determined by infrared, mass spectrometry analysis and NMR.

TABLE

| Silane | Moles | Metal complexes | Moles | Reaction conditions | Product |
|---|---|---|---|---|---|
| $Si_2Cl_6$ | 0.154 | $Pd(PPhMe_2)_2Cl_2$ | 0.149 | Room temp. for 1 hour | $Pd(PPhMe_2)_2(SiCl_3)Cl$. |
| $Si_2Cl_6$ | 2.2 | $Pd(PPhMe_2)_2Cl_2$ | 1.0 | do | $Pd(PPhMe_2)_2(SiCl_3)_2$. |
| $Me_2Si_2Cl_4$ | 0.131 | $Pd(PPhMe_2)_2Cl_2$ | 0.119 | 50° C. for 15 hours | $Pd(PPhMe_2)_2(SiMeCl_2)Cl$. |
| $Me_2Si_2Cl_4$ | 0.236 | $Pd(PPhMe_2)_2Cl_2$ | 0.118 | 50° C. for 43 hours | $Pd(PPhMe_2)_2(SiMeCl_2)_2$. |
| $Si_2Cl_6$ | 0.097 | $Pt(PPhMe_2)_2Cl_2$ | 0.093 | Room temp. for 3 hours | $Pt(PPhMe_2)_2(SiCl_3)Cl$. |
| $Si_2Cl_6$ | 0.132 | $Pt(PPhMe_2)_2Cl_2$ | 0.086 | do | $Pt(PPhMe_2)_2(SiCl_3)_2$ and $Pt(PPhMe_2)_2(SiCl_3)Cl$. |
| $Me_4Si_2Cl_2$* | 0.425 | $Pd(PPhMe_2)_2Cl_2$ | 0.107 | 70° C. for 16 hours | |

*This run is given for comparison.

EXAMPLE 2

This example shows the reaction of hydrosilanes with the metal phosphine complexes. Following the procedure of Example 1 the reactions shown below were carried out giving the indicated products.

TABLE

| Silanes | Moles | Metal complexes | Moles | Reaction conditions | Product |
|---|---|---|---|---|---|
| $HSiCl_3$ | 0.322 | $Pd(PPhMe_2)_2Cl_2$ | 0.1 | 50° C. for 64 hours | $Pd(PPhMe_2)_2(SiCl_3)Cl$. |
| $HMeSiCl_2$ | 0.21 | $Pd(PPhMe_2)_2Cl_2$ | 0.09 | do | $Pd(PPhMe_2)_2(SiMeCl_2)Cl$. |
| $HSiCl_3$ | 0.17 | $Pt(PPhMe_2)_2Cl_2$ | 0.07 | 70° C. for 86 hours | $Pt(PPhMe_2)_2(SiCl_3)Cl$. |
| $HMe_2SiCl$* | 0.234 | $Pd(PPhMe_2)_2Cl_2$ | 0.102 | 50° C. for 64 hours | |

*This run is given for comparison only.

EXAMPLE 3

When the following disilanes are reacted with the following Pd phosphine halides in equal molar amounts, at 50° C. in accordance with the procedure of Example 1, the following products are obtained.

TABLE

| Disilane | Pd halide | Product |
|---|---|---|
| $Ph_2Si_2Cl_4$ | $PdBr_2(PBu_3)_2$ | $Pd(SiPhCl_2)(PBu_3)_2Br$. |
| $(C_6H_{11})_2Si_2Cl_4$ | $PdI_2(PBu_3)_2$ | $Pd(SiC_6H_{11}Cl_2)(PBu_3)_2I$. |
| $(C_3H_5)_2Si_2Cl_4$ | $Pd\{P(CH_2Ph)_3\}_2Cl_2$ | $Pd(SiC_3H_5Cl_2)\{P(CH_2Ph)_3\}_2Cl$. |
| $(PhCH_2)_2Si_2Cl_4$ | $Pd\{P(CHMe_2)Me_2\}_2Cl_2$ | $Pd(SiCH_2PhCl_2)\{P(CHMe_2)Me_2\}_2Cl$. |
| $(C_{18}H_{37})_2Si_2Cl_4$ | $Pd\{P(C_3H_5)_3\}_2Cl_2$ | $Pd(SiD_{18}H_{37}Cl_2)\{P(C_3H_5)_3\}_2Cl$. |
| $Me_2Si_2Cl_4$ | $Pd\{P(C_{10}H_{21})_3\}_2Cl_2$ | $Pd(SiMeCl_2)\{P(C_{10}H_{21})_3\}_2Cl$. |
| $(C_6H_9)_2Si_2Cl_4$ | $Pd\{P(C_6H_9)Me_2\}_2Cl_2$ | $Pd(SiC_6H_9Cl_2)\{P(C_6H_9)Me_2\}_2Cl$. |
| $(MeC_6H_4)_2Si_2Cl_4$ | $Pd\{P(C_6H_4Me)Me_2\}_2Cl_2$ | $Pd\{Si(C_6H_4Me)Cl_2\}\{P(C_6H_4Me)Me_2\}_2Cl$. |
| $(Naphthyl)_2Si_2Cl_4$ | $Pd(PBu_3)_2Cl_2$ | $Pd\{Si(naphthyl)Cl_2\}(PBu_3)_2Cl$. |
| $(PhC_6H_4)_2Si_2Cl_4$ | $Pd\{P(C_{10}H_{21})Me_2\}_2Cl_2$ | $Pd\{Si(C_6H_4Ph)Cl_2\}\{P(C_{10}H_{21})Me_2\}_2Cl$. |

That which is claimed is:

1. The method of preparing silyl transition metal complexes comprising reacting disilanes of the formula $$R_nSi_2Cl_{6-n}$$

or hydrosilanes of the formula $HSiR_bCl_{3-b}$ with $$M(PR'_3)_2Y_2$$

at a temperature not greater than 150° C. in the absence of an acid acceptor whereby compounds of the formula $M(PR'_3)_2(SiR_bCl_{3-b})_mY_{2-m}$ are obtained in which R is a monovalent hydrocarbon radical of 1 to 8 carbon atoms,
R' is a monovalent hydrocarbon radical of 1 to 10 carbon atoms,
n is an integer from 0 to 2,
b is an integer from 0 to 1,
M is Pd or Pt,
Y is a halogen other than fluorine and
m is an integer from 1 to 2.

2. The method in accordance with claim 1 in which the reactants are a disilane of the formula $R_nSi_2Cl_{6-n}$ and $M(PR'_3)_2Y_2$.

3. The method in claim 1 in which the reactants are a silane of the formula $HSiR_bCl_{3-b}$ and $M(PR_3)_2Y_2$.

4. A composition of matter of the formula $$Pd(PR'_3)_2(SiR_cCl_{3-c})_mY_{2-m}$$

in which

R is a monovalent hydrocarbon radical of from 1 to 18 carbon atoms,
R' is a monovalent hydrocarbon radical of from 1 to 10 carbon atoms,
c is an integer from 0 to 1,
m is an integer from 1 to 2 and
Y is a halogen other than fluoride.

5. A composition of claim 4 of the formula $$Pd(PPhMe_2)_2(SiCl_3)Cl$$

6. A composition of claim 4 of the formula $$Pd(PPhMe_2)_2(SiMeCl_2)Cl$$

7. A composition of claim 4 of the formula $$Pd(PPhMe_2)_2(SiCl_3)_2$$

8. A composition of claim 4 of the formula $$Pd(PPhMe_2)_2(SiMeCl_2)_2$$

References Cited

Chatt et al.: J.C.S., A–8, pp. 1343–51, 1970.
"Chemical Abstracts," 67, 104719r, 1967.
"Chemical Abstracts," 72, 132880h, 1970.
"Chemical Abstracts," 72, 72225v, 1970.

DANIEL E. WYMAN, Primary Examiner

P. F. SHAVER, Assistant Examiner

U.S. Cl. X.R.

260—448.2 D, 448.2 E, 448.8 R

U.S. PATENT OFFICE
UNITED STATES PATENT OFFICE
CERTIFICATE OF CORRECTION

Patent No. 3,746,732               Dated: July 17, 1973

It is certified that errors appear in the above-identified patent and that said Letters Patent are hereby corrected as shown below:

Column 3, line 59, in claim 1, "8" should read --18--.

Column 4, line 47, in claim 4, "fluoride" should read --fluorine--.

Signed and sealed this 2nd day of April 1974.

(SEAL)
Attest:

EDWARD M. FLETCHER, JR.
Attesting Officer

C. MARSHALL DANN
Commissioner of Patents